United States Patent [19]

Domkowski

[11] 4,053,166
[45] Oct. 11, 1977

[54] TWO-PIECE SEAL

[75] Inventor: Ronald A. Domkowski, Arlington Heights, Ill.

[73] Assignee: Halogen Insulator & Seal Corporation, Elk Grove, Ill.

[21] Appl. No.: 638,522

[22] Filed: Dec. 8, 1975

[51] Int. Cl.² .............................................. F16J 15/32
[52] U.S. Cl. .................................... 277/152; 277/165; 277/205; 277/231
[58] Field of Search ................. 277/176, 177, 178, 24, 277/205, 231, 165, 152

[56] References Cited

U.S. PATENT DOCUMENTS

| 2,914,369 | 11/1959 | Hayman | 277/176 UX |
| 3,028,166 | 4/1962 | Adamson | 277/231 |
| 3,254,898 | 6/1966 | Herberar et al. | 277/176 |
| 3,394,941 | 7/1968 | Traub | 277/165 |
| 3,848,880 | 11/1974 | Tanner | 277/176 |

FOREIGN PATENT DOCUMENTS

| 1,909,530 | 9/1970 | Germany | 277/24 |

Primary Examiner—Richard E. Aegerter
Assistant Examiner—L. Footland
Attorney, Agent, or Firm—Fitch, Even, Tabin & Luedeka

[57] ABSTRACT

An annular composite two-piece seal is described for sealing engagement with a reciprocating member. The composite seal includes a soft, flexible, annular sealing ring having an annular sealing lip with a chamfered portion facing the high pressure side of the seal and inclined toward the reciprocating member, and having an axially and circumferentially extending wall for sealing engagement with an axially directed circumferential wall of a groove in a stationary member receiving the seal. A second annular sealing ring of harder and lower friction material is formed with a circumferentially extending sealing lip for engaging the reciprocating member. Both of these sealing lips seal with the reciprocating member at a low pressure loading of the seal. The sealing lip on the second ring is deflected into tighter sealing engagement with the reciprocating member with increased pressure on the first ring. Mating interlocking portions on these rings prevent substantial displacement therebetween and thus reduce the likelihood of bypass leakage between the rings.

3 Claims, 5 Drawing Figures

TWO-PIECE SEAL

This invention relates generally to seals for sealing a moving piston rod, cylinder or the like. It is specifically directed to a new and improved, composite, two-piece seal for sealing a reciprocating member, such as a piston rod, from a stationary member.

Various types of seals, including two-piece seals, have been developed for hydraulic and pneumatic sealing applications. Such two-piece seals have generally included a first, relatively soft, resilient sealing ring (made of rubber, for example) and a second less resilient and harder sealing ring (made of a low-friction material). Typically, the sealing rings are disposed one atop the other and seated in an annular sealing groove so that at least one ring is in sealing contact with a reciprocating member. Some such seals provide substantial seal contact areas on both the softer and the harder seal rings to insure that an effective seal is available for high pressure applications. However, such a seal, by virtue of its substantial seal contact area, introduces an undesirable amount of friction in low pressure applications where less seal contact area is preferable.

In some cases, the degree of contact between the sealing rings and the cylinder rod is made to vary substantially with the applied pressure. Even with seals of this type, the harder seal ring often has a greater degree of contact with the cylinder rod than is necessary at low pressures. In one particular two-piece seal of the variable contact type, both the softer ring and the harder ring contact the cylinder rod at low pressures, the harder ring particularly having a large (and undesirable) contact area. As pressure increases, the softer ring presses against the harder ring and the softer ring is cammed away from the rod and loads the higher pressure ring to seal more tightly against the rod. While increasing the sealing ability of the harder ring is desirable at high pressures, camming the softer ring away from the rod may be disadvantageous since the softer ring is the better sealer.

More recently, composite seals have been illustrated which purportedly introduce only a small amount of friction at low pressures. One such seal is shown in U.S. Pat. No. 3,848,880 and includes a soft ring which mates with a harder ring as described above. The harder ring, in order to minimize friction, has no sealing contact with either surface to be sealed at low pressures. A disadvantage of such a seal is that, should the softer ring deform or in some way fail, the integrity of the seal would be lost at low pressures.

In addition to tightly sealing against the reciprocating member, a tight seal must be made with the stationary member at the annular sealing groove to prevent bypass flow about the seal. Such a tight seal with the stationary member has been lacking in seals having one harder ring mating with one softer ring with the harder ring having substantial contact with both the piston rod and the stationary member Since the harder seal is generally of the low-friction type, such contact may be desirable when sealing two moving members. However, when sealing a reciprocating member from a stationary member, it is usually undesirable to permit the harder, low-friction ring to contact the stationary member. This is because it is generally desirable to establish a firm interference fit with as much friction as possible between the seal and the stationary member. Thus, allowing the low-friction ring to contact the stationary member uses up contact area which could preferably be occupied by the softer, higher-friction ring. Accordingly, it is preferable to increase the contact area between the softer, higher-friction ring and the stationary member since the softer ring is the better sealer and the friction it introduces between itself and the stationary member will tend to hold the seal in place.

A more obvious drawback to some prior two-piece seals is that, since they may be installed as two separate pieces, their storage and handling is undesirably complicated. Also the possibility of bypass leakage at the interface between the two rings is present, particularly when rapid movement of a reciprocating member takes place or when the two rings separate locally due to deformation or other failure of one of the rings, In light of the above-stated problems which exist with prior two-piece seals, it is a general object of this invention to provide an improved two-piece seal for sealing a reciprocating member from a stationary member.

It is another object of this invention to provide a two-piece seal with improved sealing between the stationary member and the seal to prevent bypass flow therebetween.

These and other objects of the invention are more particularly set forth in the following detailed description and in the accompanying drawings of which:

An embodiment of this invention which effectively seals a reciprocating member from a stationary member in accordance with the above stated objectives generally includes two annular sealing rings, a first softer ring and a second harder and lower friction ring. The first softer ring sits atop the second harder ring and is interlocked with it by means of a locking groove in one of the rings and a mating locking projection in the other ring. The first softer ring has an annular sealing lip for engagement with the reciprocating member. The lip has an edge which faces the high pressure side of the seal and which is inclined toward the reciprocating member. Increasing pressure forces the lip more firmly against the reciprocating member to improve its sealing effect. For sealing with the stationary member to seal flow from around the seal, the softer ring has an axially extending side wall extending substantially the length of the seal in engagement with the stationary member and also a bottom wall abutting the stationary member.

A second harder annular sealing ring is made of a low friction material and has an annular lip which extends generally axially for engagement with the reciprocating member. Both lips have their respective diameters so related to the diameter of the reciprocating member that each lip becomes radially compressed by the reciprocating member when the seal is seated in a sealing groove so that, even at low pressures, a seal interference fit is formed between the softer member and the stationary member.

Figure 1:
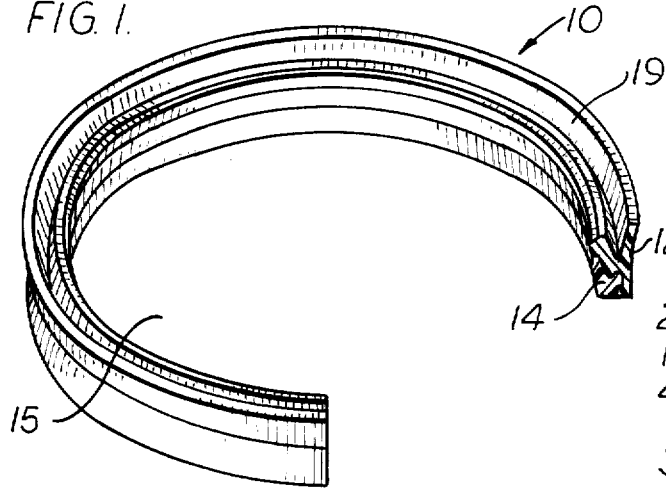
FIG. 1 is a perspective view of one embodiment of a two-piece seal constructed in accordance with this invention with a portion thereof broken away to show the seal in section.

Referring now to FIG. 1, there is shown a composite, two-piece, annular sealing ring, generally indicated at 10. Sealing ring 10 comprises two annular, discrete sealing rings, 12 and 14, which are interlocked to form a composite seal. A first soft ring 12 sits atop ring 14 as shown and is made of a relatively soft material. A second harder ring 14 is relatively harder, though flexible, and is made of a low friction material. This particular embodiment is designed to seal an inner reciprocating member which may fit in inner aperture 15 of the seal from a stationary member which may surround the outer circumferential surface of the seal.

Figure 2:
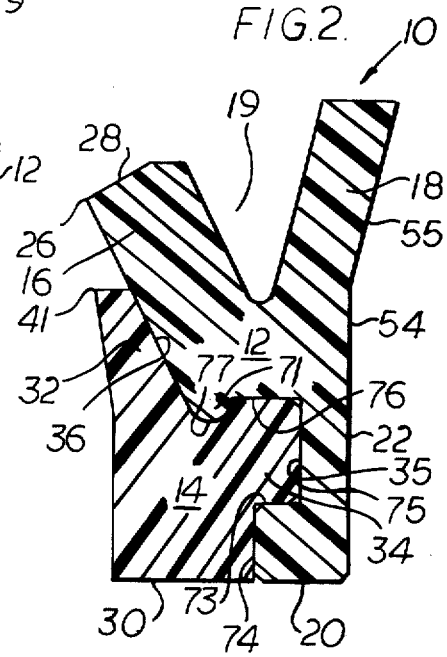
FIG. 2 is an enlarged cross-sectional view of the sealing ring shown in FIG. 1.

As shown in FIG. 2, the first, softer sealing ring 12 has a first end portion which includes two annular lips, 16, 18, between which an annular, V-shaped groove 19 is formed to allow deflection of the respective flanges from their free state shown in FIG. 1 to an operative state. The first of these lips, 16, extends generally axially but is inclined toward the inner diameter of the seal at its free end so as to face the reciprocating member when in operation. The second lip, 18, also extends generally axially but is inclined radially outwardly, i.e, toward the outer diameter of the seal so as to face the stationary member 38 when in operation. When the composite seal is operably situated in a sealing groove or cavity 37 (FIG. 3), lips 16 and 18 are radially compressed toward each other so that an interference fit is effected at their points of contact with reciprocating member 40 and stationary member 38 respectively.

For the purpose of reducing any bypass flow between the stationary member 38 (FIG. 3) and the seal, the more resilient ring 12 is to engage the circumferential groove wall 39 throughout substantially its entire length and preferably also at a bottom or lower pressure end wall 43 of the groove 38. Herein, the second ring 14 has no contact with the circumferential groove wall 39 and the softer ring exclusively contacts this wall and is able to deflect and engage the latter and conform more intimately thereto than would the harder ring.

Figure 3:
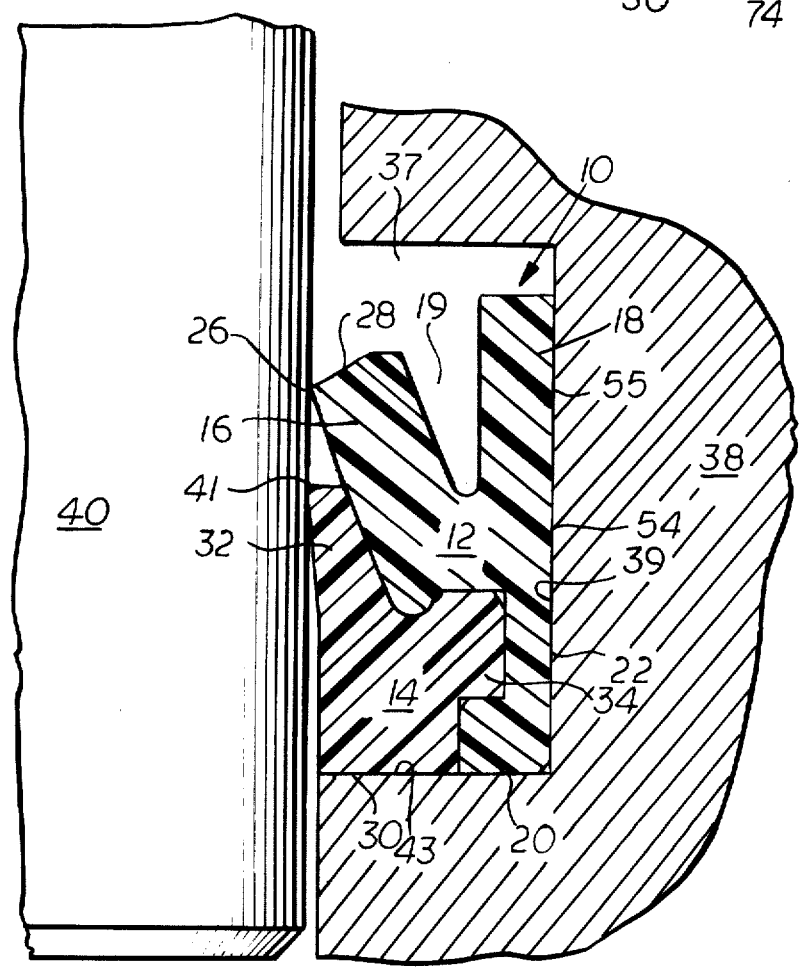
FIG. 3 is a fragmentary cross-sectional view of the FIG. 1 seal installed in a sealing groove and operating under low pressure conditions.

Referring now to FIGS. 2 and 3, the softer ring 12 includes an axially extending wall 54 comprising a lower constant diameter portion 22 and an outwardly inclined portion 55 on the deflectable lip 18. At the low pressure side of the seal, the softer ring 12 has a radially extending wall or end face 20 for abutting in sealing engagement end wall 43 extending radially at the low pressure side of the groove.

Figure 4:
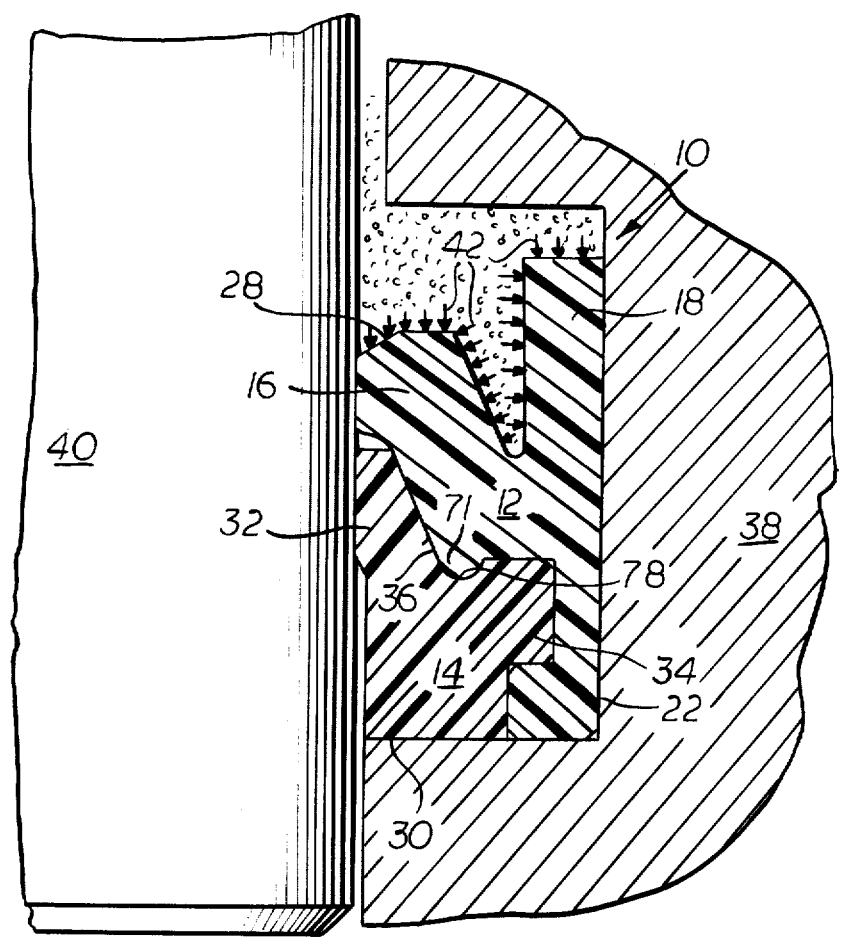
FIG. 4 is a fragmentary cross-sectional view of the FIG. 1 sealing ring installed in a sealing groove and operating under high pressure conditions.

Lip 16 terminates in a chamfered portion 28 and a sealing edge 26 which, as will be shown in the discussion to follow, makes an interference fit with the reciprocating member. The chamfered portion 28 is downwardly inclined toward the reciprocating member so that the pressure which is exerted on chamfered portion 28 forces lip edge 26 more tightly with increased bearing pressure against the reciprocating member to improve the sealing effect therebetween, particularly at high pressure loading, as shown in FIG. 4.

The second harder ring 14 also seals with the reciprocating member and, to this end, is formed with an annular lip 32 which extends generally axially from a bottom end wall 30 with a slight inclination toward the inner diameter of the seal at its free end. The lip 32 is formed with a diameter to form an interference fit with the reciprocating member. The amount of contact which the sealing lip 32 (as well as the sealing lip 16 of the first ring) has with the reciprocating member will change, as will the bearing pressure with the amount of pressure applied to the seal.

Seal ring 14 also includes a locking projection 34 which extends generally away from the reciprocating member and mates with a locking groove, as shown, in the first softer ring 12. The locking effected by virtue of locking projection 34 locks rings 12 and 14 together to substantially prevent relative movement between them and to thereby eliminate the possibility of bypass leakage between them.

Lips 16 and 32 have tapered surfaces which abut along line 36 so that, as pressure increases on the seal, the inclined surface of lip 16 presses against the inclined surface of lip 32 and forces lip 32 into greater contact with the reciprocating member.

In accordance with the present invention, the likelihood of fluid flowing along the interface between the first and second seal rings 12 and 14 has been reduced substantially by interlocking them together against displacement by axial shifting relative to one another. To this end, a locking projection is provided on a first one of the rings and a locking groove is provided on the other of the rings for receiving the projection. In this instance, a locking projection 34 (FIG. 2) of generally annular shape is formed on the outer circumference of the sealing ring 14 and is of a larger dimension than a throat through which it must pass into the locking groove 35 on the first ring 12. More specifically, the distance across the entrance to the groove 35 is smaller than the height in the axial direction of the projection 34 so that a portion of the more flexible ring 12 must be deflected to allow entrance of the projection 34 into the groove. Herein, the softer first ring 12 is formed with a downwardly projecting annular bead 71 which defines an upper corner at the throat entrance to the locking groove on the soft ring seal ring 12. The other lower corner of the entrance throat is at the juncture of a lower radially extending wall 73 and an axially extending inner wall 74 for the first ring. The groove is further defined by a generally axially extending outer wall 75 which extends upwardly to a circumferentially and radially extending top groove wall 76 which extends from the wall 75 to an arcuate surface 77 defining the lower side of the bead 71. As is readily apparent, the projection 34 is formed with complementary walls for abutting the respective groove defining walls on the first sealing ring.

When at higher pressures, as best seen in FIG. 4, the bead 71 is forced more firmly into a bead receiving groove 78 in the second sealing ring 14 to prevent flow therebetween and any slippage between the first and second rings as would allow fluid to be pumped between their interfaces. This is in contrast to provision of an open space between the first and second rings and the bodily sliding of the sealing rings as in some conventional seals. Furthermore, it will be seen that the locking projection 34 and the locking groove 35 provide a very long tortuous path for any fluid attempting to flow along the interface between the first and second sealing rings.

Referring now to FIG. 3, composite seal 10 is shown in cross-section and operably situated within the sealing groove 37 in the stationary member 38. The seal is shown under low pressure operating conditions and, as indicated in FIG. 3, portions of lips 16 and 32 form an interference fit with a reciprocating member 40, such as a piston rod.

With the seal operably situated in sealing groove 37, lip 18 is compressed and its outer side wall portion 55 is in contact with stationary member 38 to complete contact substantially along the entire side all 54. Since sealing ring 12 is of a softer and higher friction material than sealing ring 14 and since ring 12 supplies the total contact with stationary member 38, a high friction area of contact between the composite seal and stationary member 38 is provided. With ring 14 nowhere in contact with stationary member 38, the degree of friction between stationary member 38 and the composite seal is maximized.

The diameters of the lips 16 and 32 and their degree of inclination toward the reciprocating member are designed so that, at low pressures, both lips are compressed and contact reciprocating member 40 only at their respective edges. This degree of contact with reciprocating member 40 is maintained up to sealing pressures under approximately 250 pounds per square inch and forms a very low friction seal. Unlike some prior composite seals, rings 12 and 14, both being in contact with reciprocating member 40, provide extra sealing protection at low pressures. In the event of seal deformation near lip edges 26, edge 41 of lip 32 forms a back-up seal which maintains the integrity of the composite seal. When lip edge 26 is providing the primary sealing effect, edge 41 acts only as a low friction bearing contact with reciprocating member 40.

Generally, under all pressure conditions, it is desirable to minimize the friction between the seal and the reciprocating member 40. It is especially important to minimize the contact area between a soft ring seal and a reciprocating member since a soft ring seal will normally give rise to a greater amount of friction than will a harder seal. Accordingly, soft ring 12 has been designed to minimize the area of contact between lip 16 and reciprocating member 40. As shown in FIG. 3, the only portion of ring 12 which is in contact with reciprocating member 40 under low pressure conditions is edge 26. As the pressure builds up, the force applied to ring 12 tends to urge edge 26 into a firmer contact with reciprocating member 40. This response on the part of ring 12 tends to minimize friction especially at lower pressures, and is due to a so-called "negative lip" which is the chamfered portion 28 of lip 16. That is portion 28 is inclined radially toward the low pressure side and toward the reciprocating member 40, which, for the seal shown in FIG. 3, is radially inwardly and downardly. Because of the angle of chamfer on lip 16, the increasing pressure tends to increase the unit load on lip edge 26 so as to increase the sealing ability of lip edge 26. The increased sealing ability of lip edge 26 means that less surface area of lip 16 need be in contact with reciprocating member 40 at such pressures. As a result, in applications where the unit loading on lip edge 26 provides all the necessary sealing effect, a very low friction seal is provided. At higher pressures, however, lip 16 does provide the required, increased area of contact with reciprocating member 40 in a manner to be described below.

When the composite seal 10 is used in applications where higher pressures are involved, a greater degree of contact is required between lips 16 and 32 and reciprocating member 40 to provide for the increased degree of sealing required. Composite seal 10 responds to such higher pressures by increasing the contact area of lips 16 and 32 as shown in FIG. 4. The pressure now applied to seal 10, represented schematically by arrows 42, causes lip 16 to be deflected and pressed against reciprocating member 40 and provides a greater contact area therewith. This greater degree of contact between lip 16 and reciprocating member 40 is due substantially to the loading effect on lip 16 caused by chamfered portion 28 and the fact that rings 12 and 14 cannot move bodily relative to one another. Lip 16 is also urged against reciprocating member 40 by the forces acting along the tapered surfaces of lips 16 and 32 which abut along line 36 in the manner shown in FIG. 4, and provides the greater degree of sealing required at higher pressures.

With ring 12 now under a greater amount of pressure, lip 16 now presses against lip 32 where their tapered surfaces meet. This pressure on lip 32 deflects it into greater contact with reciprocating member 40 and thereby increases its sealing ability. Since ring 14 is made of a low friction material, the increased contact area of lip 32 does not increase the frictional load on reciprocating member 40 in proportion to the greater sealing ability now provided by ring 14.

The higher pressures which cause the contact areas of lips 16 and 32 to increase also tend to increase the interlocking force between rings 12 and 14 by urging the sealing head 71 more tightly into the groove 78 on sealing ring 14. This increase in the forces holding rings 12 and 14 together has the desirable effect of further minimizing the possiblity of fluid being forced through the interface between rings 12 and 14. Thus, bypass leakage of the fluid, possible in some prior composite seals, is effectively eliminated in this embodiment.

Figure 5:
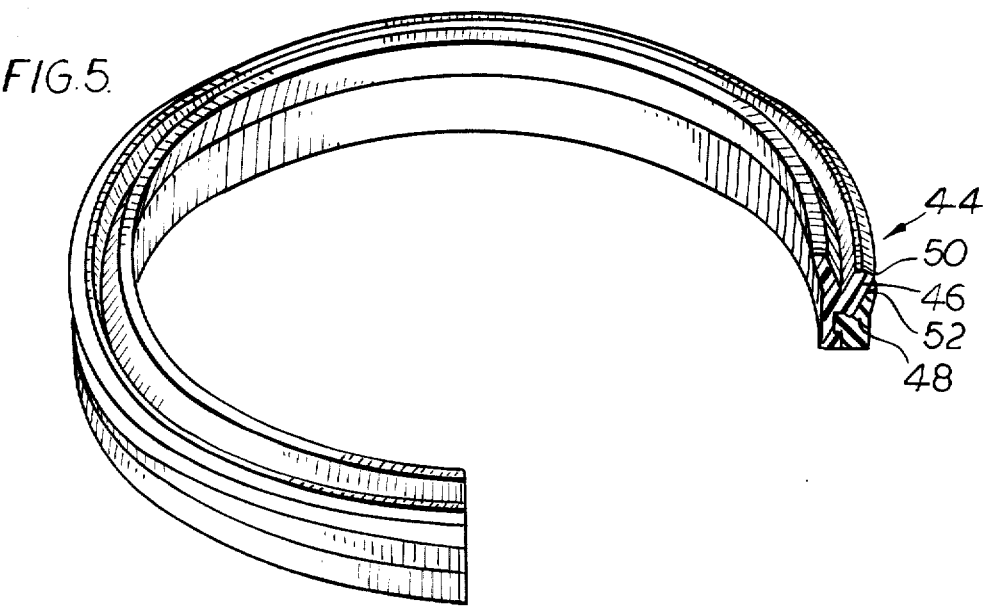
FIG. 5 is a perspective view of another embodiment of a two-piece seal constructed in accordance with this invention, this particular embodiment being useful for sealing, at its outer diameter, an outer reciprocating or stationary member from an inner stationary or reciprocating member.

The composite two-piece seal thus far described in connection with FIGS. 1-4 is specifically intended for use in sealing an inner reciprocating member from an outer stationary member along the inner diameter of the seal. For example, referring to FIG. 1, the inner reciprocating member would occupy aperture 15 in ring 10 while the outer stationary member would encircle the outer diameter of ring 10. This invention is, however, not limited to such applications. This invention can also be applied to a seal which seals, along its outer diameter, an outer reciprocating member from an inner stationary member or an outer stationary member from an inner reciprocating member such as in a conventional fluid power reciprocating cylinder which utilizes a stationary cylinder and reciprocating piston. An embodiment of this invention which is specifically aimed at such an application is shown in FIG. 5. The illustrated composite seal, indicated generally at 44, includes a first softer annular ring 46 interlocked with a harder, lower friction ring 48. Composite seal 44 is substantially identical to composite seal 10 of FIG. 1 except that rings 46 and 48 have lip edges 50 and 52, respectively, which are inclined toward the outer diameter of the ring rather than toward the inner diameter of the ring as was the case with ring 10 of FIG. 1. Thus, ring 44 has all the advantages of ring 10 and is identical to it except for the fact that it seals around its outer diameter rather than around its inner diameter.

When making either soft ring 12 (FIG. 1) or ring 46 (FIG. 5), a resilient elastomer having a hardness within the range of 70-100 on the Shore A scale is recommended. One such elastomer which has been found to be very acceptable in polyurethane, particularly due to its outstanding abrasion resistance. Molded polyurethane rings generally operate satisfactorily over a temperature range of from −40° F. to +200° F. and at pressures of up to 10,000 p.s.i. and in some instances well beyond that. The seal described herein works well at low pressures (approximately 120 p.s.i. for example) and is therefore useful in pneumatic applications where the pressures are generally low.

Commercially available Buna N-rubber or Viton are also acceptable materials for the softer ring. Lubricating additives or coatings such as polytetrafluroethylene (P.T.F.E.) or molydisulfide may be combined with the material for the softer ring to further reduce friction.

For the harder ring, a low friction material having a hardness in the range of 40-70 on the Shore D scale is recommended. PTFE or others can be used, but PTFE is the preferred material due to its low coefficient of friction and other related properties.

The embodiments illustrated and described above are believed to represent distinct improvements over prior composite seals. Specifically, the illustrated seals introduce a very low degree of friction at low pressures while simultaneously providing the extra safety of a primary seal (softer ring) and a back-up seal (harder ring), both of which are in sealing contact with the reciprocating member. The seal surfaces which contact the stationary member are only that of the softer ring, thereby maximizing the friction fit between the seal and the stationary member. At higher pressures, both the harder and the softer ring increase their contact area with the reciprocating member to achieve the required greater degree of sealing. In addition, since the rings are interlocked, they effectively eliminate bypass leakage at their interface and provide for easier installation and handling.

While the invention has been described in terms of specific embodiments thereof, it is evident that many alterations, modifications and variations will be apparent to those skilled in the art in light of the disclosure above. For example, although the illustrated rings have been shown as interlocked by means of a projecting member extending from the harder ring and a mating groove in the softer ring, equally useful interlocking may be achieved by reversing the roll of the two rings; that is, the projecting member may be made a part of the softer ring while mating groove may be placed in the harder ring. Such a variation does not depart from the essence of this invention. Accordingly, it is intended to embrace all such alterations, modifications and variations which fall within the spirit and scope of this invention as defined by the following claims.

What is claimed is:

1. A composite seal for sealing engagement with a radially extending end wall and an axially extending wall defining an annular cavity in a stationary member and for sealing with a moving member, said seal comprising:
   a first soft flexible annular sealing ring made of elastomeric material having an annular sealing lip edge for sealing engagement with the moving member at first predetermined pressures, said sealing lip having a chamfered edge inclined to be pressed by higher pressure forces to have greater contact area;
   a second lip on said first sealing ring being inclined radially away from said first lip said second lip being spaced from said first lip and defining an annularly extending groove therebetween;
   an axially extending wall on said first sealing ring extending from said second lip and coacting with said second lip for sealing engagement with the axially extending wall defining the annular cavity;
   a second annular sealing ring of material harder than the material of said first sealing ring and having a friction characteristic lower than that of said elastomeric material, said second sealing ring having a radially directed extending sealing lip and having an edge for engaging said moving member at a position spaced axially downward from said annular sealing lip on said first ring, each of said sealing edges on said first and second seals having a diameter for sealing in interference with said moving member at a low pressure loading of said seal, said first and second sealing rings having surfaces abutting one another to deflect the sealing lip on said second ring to deform into greater contact area with said moving member with increased pressure on said first sealing ring,
   a radially extending end wall on said flexible sealing ring disposed behind a portion of said second sealing ring for sealing engagement with the radially extending end wall on said stationary member, said axially extending wall on said first sealing ring extending from said second lip to said end wall, and
   interlocking means on said first and second sealing rings mated with one another to prevent substantial relative displacement bodily of said first sealing ring relative to said second sealing ring and thereby reducing a likelihood of bypass leakage between said first and second sealing rings.

2. A composite seal in accordance with claim 1 in which said interlocking means comprises an annular groove having a throat of narrow dimension through which is forced a portion of the second sealing ring into said groove for tight engagement thereby reducing the likelihood of bypass leakage between said first and second sealing rings.

3. A composite seal in accordance with claim 1 in which tapered surfaces are provided on the abutted sealing lips on said first and second sealing rings with the taper of the sealing lip with the first pressure ring pressing the tapered surface of the second sealing ring into greater contact with the moving member at higher pressures.

* * * * *